US011899813B2

(12) United States Patent
Hay et al.

(10) Patent No.: US 11,899,813 B2
(45) Date of Patent: *Feb. 13, 2024

(54) DATA SECURITY USING MULTI-FACTOR AUTHENTICATION

(71) Applicant: salesforce.com, inc., San Francisco, CA (US)

(72) Inventors: Marla Hay, Portland, OR (US); Joshua David Alexander, Austin, TX (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,842

(22) Filed: Jun. 24, 2022

(65) Prior Publication Data

US 2022/0327231 A1 Oct. 13, 2022

Related U.S. Application Data

(63) Continuation of application No. 17/111,705, filed on Dec. 4, 2020, now Pat. No. 11,429,741.

(51) Int. Cl.
*G06F 21/00* (2013.01)
*G06F 21/62* (2013.01)
*G06F 21/34* (2013.01)
*G06F 21/31* (2013.01)

(52) U.S. Cl.
CPC ........ *G06F 21/6227* (2013.01); *G06F 21/316* (2013.01); *G06F 21/34* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 6,308,273 B1 * | 10/2001 | Goertzel | ................... | H04L 9/40 726/2 |
| 6,389,542 B1 | 5/2002 | Flyntz | | |
| 6,668,322 B1 * | 12/2003 | Wood | ...................... | G06F 21/41 713/182 |
| 7,350,204 B2 * | 3/2008 | Lambert | ................. | G06F 21/51 717/172 |

(Continued)

*Primary Examiner* — Maung T Lwin
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to multi-factor authentication for data security. In some embodiments, a computer system receives, from a user device, a database operation request that specifies a set of query data, where the computer system supports multiple different security levels requiring different subsets of a set of authentication factors supported by a known device of a user of the user device. Various devices may determine current contextual information for the database operation request, where the contextual information indicates the set of query data. In some embodiments, the computer system selects, based on the current contextual information, a security level from the multiple different security levels. In some embodiments, the computer system revokes, based on the selected security level, access privileges of the user for accessing a database corresponding to the database operation request.

20 Claims, 7 Drawing Sheets

(56) References Cited

U.S. PATENT DOCUMENTS

| | | | |
|---|---|---|---|
| 7,774,827 B2* | 8/2010 | Kinser | G06F 21/6218 |
| | | | 726/2 |
| 8,572,683 B2* | 10/2013 | Radhakrishnan | G06F 21/33 |
| | | | 713/182 |
| 9,286,481 B2* | 3/2016 | Ghosh | G07C 9/21 |
| 10,754,972 B2 | 8/2020 | Efendiyev et al. | |
| 10,812,476 B2 | 10/2020 | Alexander | |
| 2002/0147924 A1 | 10/2002 | Flyntz | |
| 2005/0149726 A1* | 7/2005 | Joshi | G06F 21/51 |
| | | | 726/4 |
| 2012/0054875 A1 | 3/2012 | Antill | |
| 2013/0298259 A1 | 11/2013 | Mattsson | |
| 2019/0236297 A1 | 8/2019 | Efendiyev, Jr. | |
| 2019/0238532 A1 | 8/2019 | Alexander et al. | |
| 2020/0007554 A1* | 1/2020 | Vincent | G06F 21/31 |
| 2020/0193052 A1 | 6/2020 | Dubois | |
| 2021/0165898 A1* | 6/2021 | Weiss | G06F 16/13 |

\* cited by examiner

US 11,899,813 B2

DATA SECURITY USING MULTI-FACTOR AUTHENTICATION

The present application is a continuation of U.S. application Ser. No. 17/111,705, entitled "Data Security Using Multi-Factor Authentication," filed Dec. 4, 2020, the disclosure of which is incorporated by reference herein in its entirety.

BACKGROUND

Technical Field

This disclosure relates generally to data security, and, more specifically, to techniques for determining authentication requirements e.g., for requested database operations.

Description of the Related Art

Database management systems storing both production and non-production data often experience a decrease in performance when old data (e.g., data that is no longer in use) accumulates over time, particularly in situations in which the database is not monitored to prevent such accumulation. This accumulation also dilutes the effectiveness of analytics applied across the data stored by such database management systems. On the other hand, if individuals can easily delete data from such systems, this also introduces issues, such as accidental or malicious deletion of data that should not be removed from the system.

DETAILED DESCRIPTION

Figure 1:
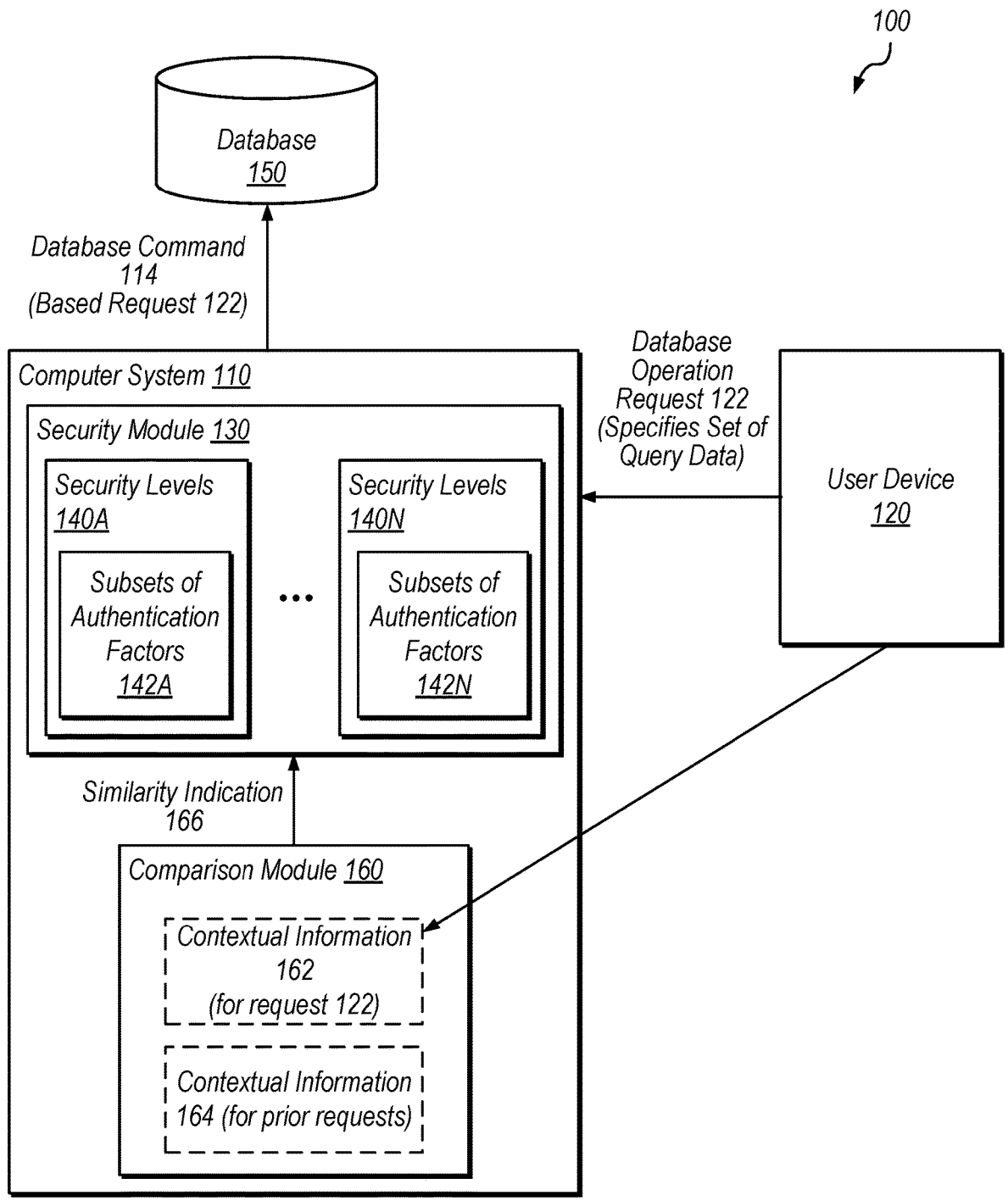
FIG. 1 is a block diagram illustrating an example system configured to determine whether to authorize requested database operations, according to some embodiments.

Traditional techniques for authorizing database operations often include requiring login credentials as well as a formal request for a database operation. In response to receiving a database operation request, traditional security systems may display a pop-up message asking whether the requesting user is certain they want to perform the requested operation. Due to the generic nature of these pop-up messages as well as the frequency with which these uses receive such messages, user may not actually read the messages. As a result, users often click a "yes" included in these messages without realizing what they are authorizing (e.g., they unintentionally delete or alter data). This in turn can lead to greater costs to entities who own this data, particularly in situations in which the deletion or alteration cannot be reversed. In the SALESFORCE.COM context, an organization as well as its administrators, users, customers, etc. may be at risk if data associated with this organization were to be accidentally deleted from either a production or non-production environment, or both. As such, these platforms make it difficult to delete data within an organization. This in turn, however, may reduce the performance of the organization as well as dilute the value of analytics applied across such data (e.g., when data of little value or purpose is not removed).

In contrast, the disclosed techniques implement multi-factor authentication for database management systems e.g., which allows for manipulation of appropriate data, while maintaining a high level of security by only allowing authorized individuals to remove such data. In particular, this multi-factor authentication is catered to different database operations, providing varying levels of security according to a given type of database operation included in a request as well as the individual submitting the request. For example, database operations may be performed for masking data, deleting data, archiving data, etc. As used herein, the term "authentication" is intended to be construed according to its well-understood meaning in the art, which includes verifying an identity of an entity. For example, authenticating a user may include determining whether the user is the owner of an account or device, or both. Multi-factor authentication techniques involve verification of more than one factor for a given user. For example, a multi-factor authentication process may involve verification of two or more of the following categories of factors: what you are (biometric identifiers, known behaviors, etc.), what you have (a credit card, a key, etc.), what you know (e.g., a personal identification number (PIN), a password, a key phrase, etc.). As one specific example, a first factor in a multi-factor authentication process may be a user logging into their device using a username and password, while a second factor may be a passive factor such as a geolocation of the user's device. Passive factors do not require input from a user for verification.

In addition to observing the type of database operation specified in a request, the disclosed security system may determine the context in which the request is submitted. Specifically, the system may determine a time the request was submitted, information about the device submitting the request (e.g., geolocation, IP address, etc.), devices nearby the requesting device, etc. This information may be used to determine a level of security necessary for the database operation request. In particular, the disclosed security system may determine a subset of supported authentication factors to be verified prior to authorizing the requested database operation.

The disclosed techniques apply multi-factor authentication technology to solicit authorization by appropriate entities in a contextually relevant manner that draws the attention of the entities to the details of a request database operation. As such, these techniques may advantageously reduce or remove liability issues and risks associated with requested database operations. Said another way, the disclosed techniques may reduce or prevent individuals from, accidentally or knowingly, performing database operations that manipulate data in an undesirable (and often irreversible) manner. Such techniques may improve the overall security of database management systems, thereby increasing confidence of entities utilizing such database management systems.

Database Security System

FIG. 1 is a block diagram illustrating an example system configured to determine whether to authorize requested database operations. In the illustrated embodiment, system 100 includes database 150, user device 120, and computer system 110, which in turn includes security module 130, and comparison module 160.

Computer system 110, in the illustrated embodiment, receives a database operation request 122 from user device 120. This request 122 specifies a set of data stored in database 150 that the user of device 120 would like to query. In various embodiments, request 122 may be for a mask, archive, backup, restore, transfer, delete, replace, reconstruct, etc. operation for this set of data stored in database 150. Archiving data may involve moving data that is no longer used from a production environment to long-term storage, for example. The set of query data specified in request 122 may be for a staging environment, testing environment, production environment, etc. In response to receiving request 122, computer system 110 collects various contextual information 162 from user device 120. User device 120 may be any of various types of computing devices including mobile devices (cell phone, wearable device, etc.), desktop computers, laptops, etc. In some situations, user device 120 is a personal device, while in others it is a work or business device. In some embodiments, computer system 110 collects contextual information from other devices of the user of user device 120. As discussed in further detail below with reference to FIG. 3, user device 120 may be a mobile device with a downloaded authenticator application.

Comparison module 160, in the illustrated embodiment, compares contextual information 162 for request 122 with contextual information 164 for prior database operation requests. The prior contextual information may be for requests from user device 120 or from various other user devices. Contextual information 162 and 164 is either information associated with the database operation itself or information associated with a requesting device (e.g., user device 120). Contextual information associated with the database operation itself includes: a time request 122 was made, a type of database operation requested (e.g., mask, archive, backup, restore, transfer, delete, etc.), the set of query data (which may specify the type of data to be operated on e.g., production data), an organization associated with the data, etc. Data masking operations might include transforming the data to anonymize or pseudonymize it for security reasons. In some embodiments, a requested database operation may specify multiple different types of database operations to be performed. For example, a single database operation may request to both mask and archive a set of query data. Contextual information associated with a requesting device includes BLUETOOTH signals from nearby devices, ambient noise, ambient lighting, accelerometer data, biometrics (e.g., heart rate, change in heart rate from a baseline heart rate, pulse oximeter data, change in pulse oximeter from a baseline, etc.), temperature, altitude, atmospheric pressure, IP address, information about the user associated with the device (name, login credentials, security clearance, etc.), etc.

Comparison module 160 determines whether contextual information 162 matches contextual information 164 and to what extent. For example, comparison module 160 may determine how similar the current contextual information 162 is to contextual information for prior requests. For example, if four out of five pieces of contextual information for a current request and a prior request match, then comparison module 160 may assign a strong similarity score to the two sets of contextual information. Further details for comparing contextual information from current and prior database operation requests are discussed below with reference to FIG. 4. Based on determining how similar a current request is to prior requests, comparison module 160 sends a similarity indication 166 (which may include a similarity score) to security module 130.

Security module 130, in the illustrated embodiment, selects a security level 140 from a plurality of available security levels 140A-140N based on the similarity indication 166. In the illustrated embodiment, security levels 140A-140N include respective subsets of authentication factors 142A-142N. The subsets of authentication factors may include one or more factors supported by a known device of a user associated with the requesting device. Each subset includes at least one authentication factor and at least one factor that differs from other subsets of authentication factors. For example, these authentication factors may include any of various factors supported by user device 120 or by any other device of a user of device 120, such as a mobile phone or wearable device of the user. These supported authentication factors include: biometric identifiers, PINs, passwords, one or more computing devices co-located with user device 120, a geographic location of device 120, ambient noise relative to device 120, applications downloaded or running on device 120, etc.

Based on a security level 140 selected by security module 130, computer system 110 initiates verification of the subset of authentication factors 142 corresponding to the selected security level for request 122. Verification of authentication factors is discussed in further detail below with reference to FIGS. 2-4. If computer system 110 is able to successfully verify the subset of authentication factors, then this system 110 executes database commend 114 based on request 122 on database 150. That is, if the appropriate authentication factors are verified for a request 122, then system 110 authorizes the database operation specified in this request.

In some embodiments, any of various systems other than computer system 110 perform the database operation on data stored in database 150. For example, computer system 110 makes an authorization decision and provides this decision to another system configured to perform operations on database 150. In such situations, computer system 110 is a security server that interacts with user devices, but may not interface with database 150.

In this disclosure, various "modules" operable to perform designated functions are shown in the figures and described in detail above (e.g., security module 130, comparison module 160, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

The disclosed customized multi-factor authentication techniques for determining whether to authorize a requested database operation may advantageously draw the attention of individuals submitting these requests to important details of the requests. This may reduce liability issues and risks associated with such requests. For example, if an individual mistakenly submits a request to irreversibly delete data in a production environment, but the disclosed system sends an authorization message to this individual informing them of their requested deletion, this enables the user to reverse their request prior to the data being lost (i.e., deleted). In addition, authorization messages may be sent to a manager of the individual submitting the request, thereby providing further checks and balances for this deletion request.

In other situations, the disclosed security level selection techniques may reduce a number of authentication factors necessary for authorization of a requested database operation. For example, if a requested database operation is determined to be low risk, then less authentication factors may require verification prior to authorizing this request. This may free up computing resources (e.g., of an authentication server) as well as reduce number of authentication factors that individuals need to supply, which will reduce the latency of data management by decreasing the amount of time necessary to authorize database requests. In addition, the disclosed techniques may reduce the number of authentication factors that require user input when enough contextual information is available to automatically verify authentication factors for the request (i.e., without user input). Such techniques may save users time and frustration, while still maintaining the same level of security.

Example Authorization Request

Figure 2:
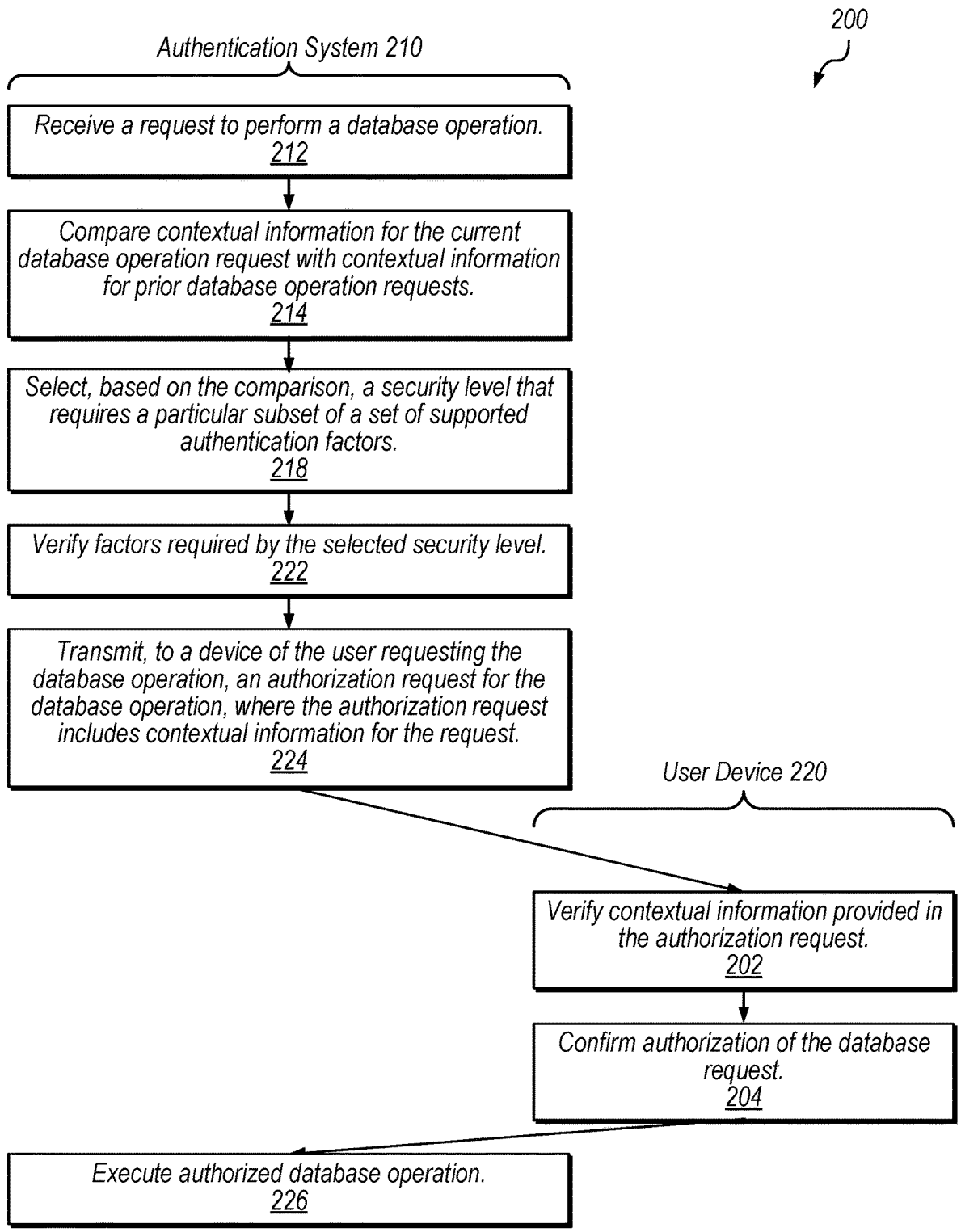
FIG. 2 is a flow diagram illustrating an example method for determining whether to authorize a database operation request, according to some embodiments.

FIG. 2 is a flow diagram illustrating an example method for determining whether to authorize a database operation request. In the illustrated embodiment, method 200 includes several elements performed by authentication system 210 and a couple elements performed by user device 220. Authorization system 210 is one example of computer system 110. The method shown in FIG. 2, however, may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At element 212, in the illustrated embodiment, authentication system 210 receives a request to perform a database operation. This database operation request is received from a computing device associated with a particular user. For example, this request may be received from user device 120. As discussed above, this database operation could be any of various types of operations to be performed on any of various types of data. As one specific example, the requested database operation may specify to archive a set of temperature readings for a plurality of employees of a company that are older than two weeks in order to comply with regulations for private user data (e.g., general data protection regulation (GDPR), trusted third party auditor (TTPA), etc.). In order to ensure that the correct temperature data is archived (which may be an irreversible process), authentication system 210 proceeds with performing the disclosed security techniques.

At 214, authentication system 210 compares contextual information for the database operation with contextual information for prior database operation requests. As discussed above, authentication system 210 attempts to determine whether similar database operations have been requested by this (or other) users in the past. For example, if a particular user submits a data archive request every Friday at 5 PM for employee temperature data from the same device (e.g., their work desktop computer), then authentication system 210 will recognize that this database operation is low risk due to it being a regularly scheduled operation that has been authorized in the past (e.g., this request was not submitted by mistake or malintent).

At 218, authentication system 210 selects, based on the comparison at 214, a security level that requires a particular subset of a set of supported authentication factors. Continuing with the example described in the paragraph above, based on the requested database operation being a regularly requested and regularly authorized operation, authentication system 210 may select a security level that does not require input from any users for authentication factors. For example, the selected security level may automate verification of its required set of authentication factors. In some instances, this may be by way of verifying passive authentication factors such as a geolocation of the requesting user's mobile device or BLUETOOTH signals of devices located near the requesting user's mobile device.

Consider a situation in which a user submits a request to alter a set of data when they are under duress. That is, this user is not in a stable emotional state (and, thus, may be thinking irrationally) when they submit a request e.g., to delete data. As such, the disclosed security system considers users' emotional state when determining whether to authorize their requested database operations. In some embodiments, authentication system 210 revokes a user's access to a set of data based on a selected security level. For example, the contextual information for a database operation request includes data recorded by a heart rate monitor and a pulse oximeter for a user submitting the database operation request. This information might indicate a perceived emotional state of the user (e.g., that the user is under duress). This user might be wearing a wearable device such as a smart watch that includes a heart rate monitor and pulse oximeter. Using the data collected by this user's wearable device, the authentication system 210 selects a security level which requires that this user's access rights must be revoked either temporarily or until an emotional state threshold has been met. For example, the system might determine that this user has calmed down and is, therefore, choosing to perform database operations from a rational state of mind. In some embodiments, revoking a user's access rights is performed for a predetermined amount of time specified in the selected security level.

In some embodiments, the security level is selected based on the user's heart rate or blood pressure, or both, being above a threshold. For example, if a user's heart rate and blood pressure are elevated a threshold amount above an expected baseline (e.g., this user is associated with a baseline heart rate and blood pressure according to their biomarker history), then authentication system 210 selects from a set of security levels based on the amount that the user's biomarkers have surpassed the baseline.

In some embodiments, security levels in the set of security levels require that the access rights of a user be suspended varying amounts of time. As a first example, a first security level requires that a user's access rights be revoked for five minutes based on their heart rate and blood pressure being slightly above an expected baseline. As a second example, a second security level requires that a user's access rights be revoked for an hour based on their heart rate and blood pressure surpassing the expected baseline by a much greater amount than the user's heart rate and blood pressure in the first example. As yet another example, a third security level might require a user's access rights to be suspended until their heart rate and blood pressure return to the expected baseline (e.g., which might be a couple minutes later or several hours later). In some embodiments, a selected security level might specify that, even though a user's heart rate and blood pressure are above a baseline, this user's request should be authorized based on other contextual information for the database operation request indicating that this is a secure request (e.g., this is a habitual request). For example, if a user makes the same delete request from the same location and same device once a week but has an elevated heart rate or blood pressure, or both, the authentication system 210 might still authorize the request based on it being a habitual request.

At 222, authentication system 210 verifies factors required by the selected security level. In some embodiments, verification of an authentication factor includes obtaining biometric information from a user requesting the database operation (e.g., a user of device 120).

At 224, authentication system transmits, to a device 220 of the user requesting the database operation, an authorization request for the database operation, where the authorization request includes contextual information for the request. In some embodiments, the authorization request is sent as a factor required by the selected security level. For example, in order to authorize the requested database operation, authentication system first obtains authorization from the user who originally requested the operation. In this example, the authorization request sent at 224 is a factor in a subset of factors required by the selected security levels.

In some embodiments, the device of the user requesting the database operation is user device 220. In other embodiments, the device used to submit the request is a device other than user device 220. This other device is also associated with the user of device 220. Said another way, user device 120 and user device 220 may not be the same computing device. For example, user device 120 may be a desktop work computer of the user submitting the database operation request, while user device 220 may be a mobile phone of this same user.

The authorization request sent at 224 may be displayed on a user interface of user device 220, for example, with different pieces of contextual information for the requested database operation. Note that the authorization request sent to user device 220 is sent via a different communication channel than the communication channel used by authentication system 210 to communicate with user device 110, for example. As such, the communication between authentication system 210 and user device 220 may be referred to as out-of-band communication.

In some embodiments, system 210 sends a second authorization request to a device associated with another user (i.e., not device 220). For example, the second authorization request may be sent to a manager of the user of device 220 or an administrator of the database system storing data specified in the requested database operation, or both. This second authorization request may specify a different set of contextual information than the information specified in the first authorization request sent to device 220. For example, the second request may specify an identifier of the user that requested the database operation as well as a device from which the request was initiated. In this example, the second authorization request is an additional factor in the subset of authentication factors required by the security level selected at 218. Authentication system 210 may send out a plurality of authorization requests to different individuals associated with differing degrees of authority.

Unlike data deletion requests, which limit the accessibility of this data to users, requests to restore or reconstruct data may require specific instructions clarifying who has access rights to the data that is being added back into the system. In some embodiments, the authorization request transmitted at 224 includes a request for data access instructions. For example, if the database operation request is a reconstruction, restoration, or replacement request, the authorization request sent to the user's device may ask the user to clarify which individuals have access to the reconstructed, restored, or replaced data. This may advantageously improve the security of this data by preventing unauthorized users from accessing this data when it is first reconstructed, restored, or replaced in the database (e.g., database 150).

At 202, user device 220 verifies contextual information provided in the authorization request. The user is able to see important details for the database operation they requested, such as a time the request was made, a set of data to be queried, an environment of the data (e.g., production), a type of operation to be performed (e.g., archive), etc. One or more of these pieces of information may be displayed in combination with the authorization request to the user via an interface of user device 220.

At 204, the user of user device 220 confirms authorization of the database request. For example, a user of device 220 may click a button displayed via a user interface of their device that confirms authorization of the database operation. User device 220 then transmits this confirmation to authentication system 210.

At 226, authentication system 210 executes the authorized database operation. For example, authentication system 210 may mask a set of query data in a test environment such that various developers working with this data are unable to see the true nature of the data. As one specific example, a set of data that includes personally identifiable information (PII) of actors and actresses needs to be kept confidential. In general, PII includes any personal information of an individual such as legal names, phone numbers, addresses, financial information, etc. In order to keep this information confidential, it is necessary to alter the names of these actors and actresses (i.e., using pseudonyms). In this example, the authorized database operation specifies the set of actor/actress information to be altered as well as pseudonyms for these individuals.

In some embodiments, authentication system 210 analyzes contextual information 164 collected for various database operation requests. Authentication system 210 is used in such scenarios to streamline data collection and processing in a central database. The processed and analyzed information can then be used to provide a useful summary to individual entities or users in addition to being used for determining whether to authorized various database operation requests. For example, the contextual information may be used for: contact tracing (e.g., to track the spread of diseases), supply chain management (e.g., food supplies for restaurants), traffic control (e.g., certain roads get higher levels of traffic than others), etc. As one specific example, based on analyzing contextual information for various users, authentication system 210 may send a particular user a notification informing them that they have been in the same location as an individual who has tested positive for a contagious virus. In this example, authentication system 210 determines that the particular user spent a certain amount of time in the same location as the positive individual based on global positioning system (GPS), WiFi, cellular tower, BLUETOOTH, near field communication (NFC), etc. data collected from both the particular individual's device(s) and the positive individual's device(s). Further, in this example, the authentication system 210 generates a model representing an exposure map from the contextual information for the particular user relative to various locations they have visited e.g., in the past 24 hours, such that this user is able to assess their potential level of exposure to a disease. Customized models may be provided to various users based on their particular contextual information over a given period of time.

Example Security Level Selection

Figure 3:
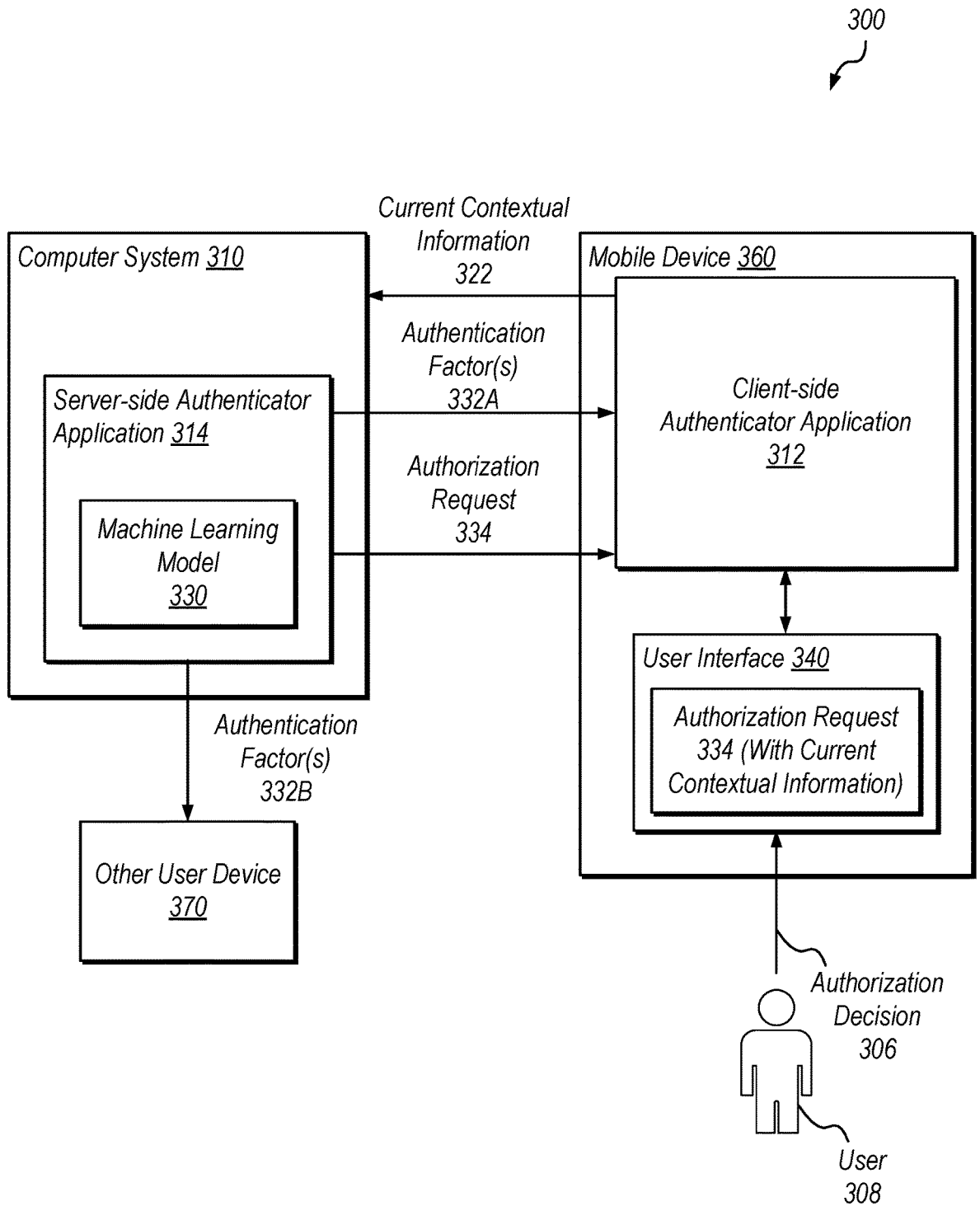
FIG. 3 is a block diagram illustrating example computer system configured to select a security level for a requested database operation using a machine learning model, according to some embodiments.

FIG. 3 is a block diagram illustrating an example computer system configured to select a security level for a requested database operation using a machine learning model. In the illustrated embodiment, system 300 includes computer system 310 and a mobile device 360 which include server-side authenticator application 314 and client-side authenticator application 312, respectively. System 300 also includes other user device 370 and user 308.

Client-side authenticator application 312 sends current contextual information 322 for a database operation requested by a user (e.g., a user of device 120) to server-side authenticator application 314. In some embodiments, mobile device 360 is the same as user device 120. In other embodiments, these two devices are different devices of the same user. For example, user 308 is a user of user device 120 that sends the database operation request, while the mobile device 360 of this same user provides the necessary contextual information for this request. In the illustrated embodiment, client-side authenticator application 312 interacts with server-side authenticator application 314 for authorization of a requested database operation. Note that server-side authenticator application 314 may be an application programming interface (API) that interacts with a webservice relying on a response from the client application (i.e., application 312).

Server-side authenticator application 314, in the illustrated embodiment, includes a machine learning model 330. In some embodiments, application 314 trains machine learning model 330 using prior contextual information for various prior database operation requests from different users (e.g., user 308 of devices 120 and 360, users of other devices, etc.). In other embodiments, machine learning model 330 is provided to application 314 from another system configured to train models using machine learning techniques. Application 314 may use any of various training techniques to train model 330, including supervised, unsupervised, semi-supervised, etc. Machine learning model 330 may be any of various types of machine learning models includes neural network, linear regression, decision tree, Naïve Bayes, K-means, K-nearest neighbor (KNN), random forest, gradient boosting algorithm, etc.

In order to train machine learning model 330, server-side authenticator application 314 assigns labels to database operation requests associated with different sets of prior contextual information. These labels indicate different security levels that are selected for database operation requests. These database operation requests are then usable to train a machine learning model to predict security levels for database operation requests based on contextual information. That is, a machine learning model learns patterns in contextual information indicating whether a database operation request is risky or not.

In some embodiments, machine learning model 330 is implemented by client-side authenticator application 312 of mobile device 360. In this scenario, client-side authenticator application 312 inputs contextual information 322 collected from its environment in response to mobile device 360 receiving an indication of a database operation request from user device 120. In some embodiments, mobile device 360 receives a trained version of machine learning model 330 from another system configured to train models using machine learning techniques. In other embodiments, mobile device 360 trains machine learning model 330 using contextual information collected by device 360 for prior database operation requests. Mobile device 360 inputs current contextual information into the trained machine learning model to determine a predicted security level to be used to authenticate a database operation request. Mobile device 360 then provides this predicted security level to server-side authenticator application 314 for initiation of the subset of authentication factors required by the predicted security level.

Server-side authenticator application 314, in the illustrated embodiment, sends one or more authentication factors 332A to client-side authenticator application 312 based on the subset of authentication factors required by the security level output by machine learning model 330. In some embodiments, factor(s) 332A require input from user 308 (e.g., a PIN, biometric identifier, etc.). In other embodiments, factor(s) 332A do not require input from user 308. For example, these factor(s) 332A may be passive factors that are verified based on contextual information such as mobile device 360 being located in a particular geofenced area. As discussed in U.S. patent application Ser. No. 16/025,885 (Pub. No. 2020/0007532) titled Automating Responses to Authentication Requests Using Unsupervised Computer Learning Techniques, in some embodiments a user device (e.g., mobile device 360) may automatically respond to requests for one or more authentication factors (e.g., factors 332A) using unsupervised computer learning techniques.

Server-side authenticator application 314 also sends an authorization request 334 to client-side authenticator application 312. This authorization request is a factor in the subset of authentication factors required by the security level output by machine learning model 330. Client-side authenticator application 312, in the illustrated embodiment, causes display of authorization request 334 with current contextual information 322 via user interface 340. In this scenario, application 312 causes user interface 340 to display the authorization request to user 308. User 308, in the illustrated embodiment, provides an authorization decision 306 to mobile device 360 via user interface 340. For example, user 308 may click on a button that says "authorize request." Client-side authenticator application 312 then sends a message to server-side authenticator application 314 indicating whether user 308 authorized the requested database operation or not.

Other user device 370, in the illustrated embodiment, receives one or more authentication factors 332B from application 314. In some embodiments, these factor(s) 332B include a second authorization request with contextual information. In this situation, other user device 370 displays an authorization request via a user interface with contextual information to a user of device 370. These authentication factor(s) 332B may also include requests for other types of input from the user of device 370 such as a password, PIN, biometric information, etc. Note that other user device 370 may be associated with a user that did not request the database operation such as the manager of the requesting user or a system administrator associated with the set of query data specified in the database operation request.

If user 308 and a user of device 370 both authorize the database operation request and if the authentication factor(s) 332A are verified, computer system 310 either executes the requested database operation or sends a confirmation message to another system configured to execute the requested operation. That is, if all authentication factors required by the security level determined by machine learning model 330 are verified, then computer system 310 authorizes the database operation request (e.g., request 122).

Note that various examples herein discuss example authentication factors that may be verified, but these examples are discussed for purposes of explanation and are not intended to limit the scope of the present disclosure. In other embodiments, any of various types of authentication factors may be verified during a multi-factor authentication process e.g., for authorization of requested database operations.

Example Contextual Information

Figure 4:
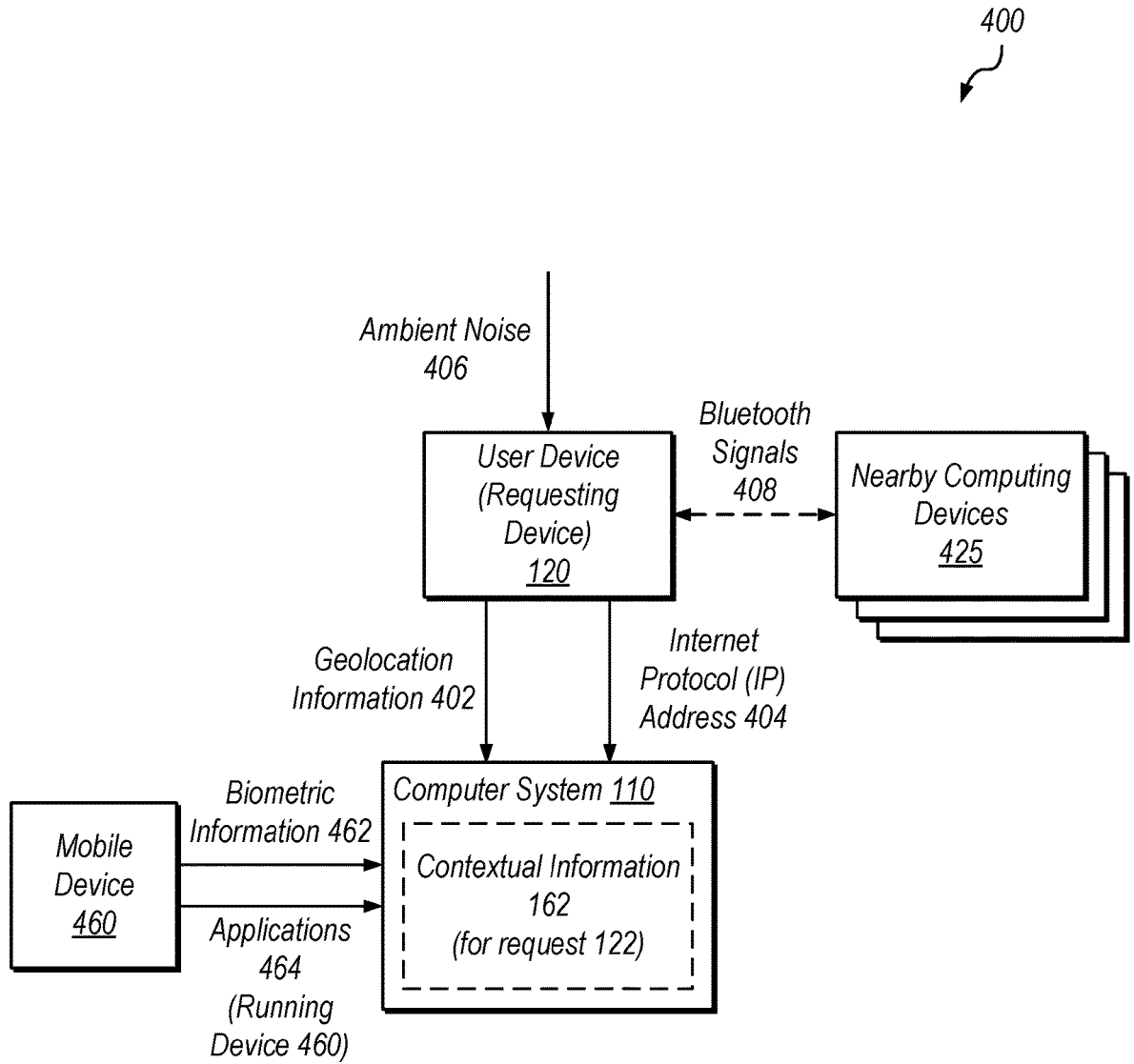
FIG. 4 is a block diagram illustrating example contextual information, according to some embodiments.

FIG. 4 is a block diagram illustrating example contextual information. In the illustrated embodiment, system 400 includes computer system 110, user device 120, mobile device 460, and nearby computing devices 425.

User device 120, in the illustrated embodiment, transmits geolocation information 402 and an internet protocol (IP) address 404 to computer system 110. Device 120 is a device from which a user submitted the database operation request 122 as shown in FIG. 1. In the illustrated embodiment, user device 120 measures BLUETOOTH signals 408 from one or more nearby computing devices 425. In some embodiments, device 120 measures various Wi-Fi signals in addition to BLUETOOTH signals. User device 120 may then transmit these measured signals 408 (and Wi-Fi signals) to computer system 110 to be used as contextual information for database operation request 122. These nearby devices 425 may be desktop computers or mobile devices, or both of coworkers of the user of device 120, for example. These nearby computing devices 425 may be any of various types of "smart" devices that include BLUETOOTH capabilities.

User device 120 records ambient noise 406 from its surrounding environment. User device 120 may then send the recorded ambient noise 406 to computer system 110. This ambient noise 406 may include things such as sounds from cars, birds, devices (cell phone ringer or vibration, a printer, etc.), music, voices, white noise, etc. occurring in the proximity to device 120.

Mobile device 460, in the illustrated embodiment, provides biometric information 462 and information 464 specifying one or more applications that are downloaded and running on mobile device 460 to computer system 110. For example, a user of device 460 may provide a fingerprint or face scan in response to a request from computer system 110 for biometric identifier(s) as factors in a multi-factor authentication procedure. Mobile device 460 may be a cell phone of the user who submitted database operation request 122, for example. In some embodiments, mobile device 460 also sends an IP address to computer system 110.

In some embodiments, mobile device 460 measures geolocation information 402, ambient noise 406, and BLUETOOTH signals 408 for user device 120. For example, user device 120 may be a desktop computer of a user. At the time this user requests a database operation, they also have their cell phone (e.g., mobile device 460) on their desk next to device 120. In this example, the user's cell phone is able to collect contextual information for a database operation request submitted by this user and then provide the contextual information to computer system 110. This may be useful in situations in which user device 120 is not configured to collect various contextual information (e.g., device 120 does not include a microphone to collect ambient noise 406).

As discussed above with reference to FIG. 1, computer system 110 selects a security level for a database operation request 122 based on comparing contextual information 162 with contextual information for prior requests (from the same or different devices). As one specific example of security level selection, if at least four out of five pieces of contextual information for a current request match contextual information for a prior request submitted by the same user as the current request, computer system selects a security level that requires verification of a single authentication factor.

As another specific example, if contextual information for a current request and a prior request from the same user match (e.g., six out of six pieces of information are the same), computer system 110 may automatically authorize the requested database operation, e.g., without requiring input from the user submitting the request. Further, consider a situation in which only two out of six pieces of contextual information are the same for a current and prior database operation request. In this situation, computer system 110 selects a security level that requires sending a first factor in the form of an authorization request to the requesting user in addition to sending a second factor to the requesting user's mobile device (e.g., requesting one or more biometric identifiers).

As yet another example, computer system 110 may determine that none of the current contextual information matches prior requests for a particular user. In this example, computer system 110 selects a security level that requires two different authorization requests to be sent e.g., one to the requesting user and one to the requesting user's manager as well as at least one other authentication factor. This at least one other factor may be a request for a PIN from the requesting user, for example. In some embodiments, computer system 110 compares contextual information for a current database operation request with contextual information associated with prior requests submitted by different users. In such situations, computer system 110 may select security levels associated with higher security relative to other security levels.

Example Methods

Figure 5:
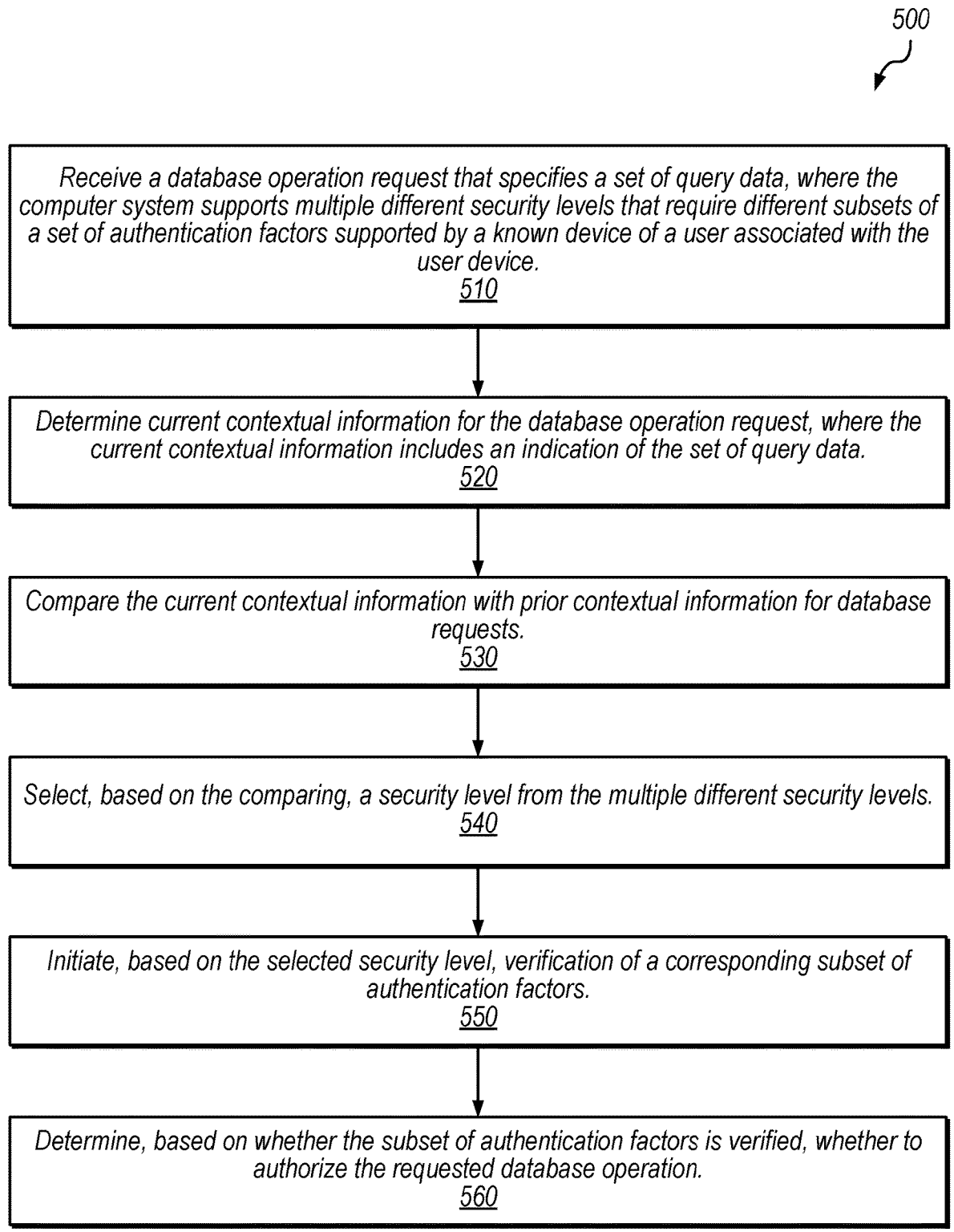
FIG. 5 is a flow diagram illustrating a method for determining whether to authorize a requested database operation based on verification of a subset of authentication factors required by a selected security level, according to some embodiments.

FIG. 5 is a flow diagram illustrating a method for determining whether to authorize a requested database operation based on verification of a subset of authentication factors required by a selected security level, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 500 may be performed by computer system 110, for example.

At 510, in the illustrated embodiment, a computer system receives a database operation request that specifies a set of query data, where the computer system supports multiple different security levels that require different subsets of a set of authentication factors supported by a known device of a user associated with the user device. In some embodiments, the subset of authentication factors includes a factor that involves a display, generated via an authenticator application, of a notification and a request for verification to a user associated with the database operation request. The authenticator application may be downloaded on a device of the user requesting the database operation, such as a smartphone and may display the notification via the smartphone screen. In other embodiments, this notification is displayed via the requesting user's desktop computer.

In some embodiments, the supported set of authentication factors includes one or more of the following types of authentication factors: a biometric identifier, a personal identification number (PIN), a password, one or more computing devices within the same geolocation as the user device, a geolocation of the user device, ambient noise relative to the user device, and one or more applications downloaded on the user device.

At 520, the computer system determines current contextual information for the database operation request, where the current contextual information includes an indication of the set of query data. In other embodiments a device of the user associated with the database operation request determines the current contextual information. For example, this user's mobile device may determine contextual information for the request, even in situations in which the request was not submitted from the user's mobile device. In some embodiments, the contextual information includes one or more of the following types of information for the database operation request: an identifier of the user submitting the request, a set of data indicated in the request, an organization of the user submitting the request, an identifier of the user device, a timestamp of the request, and a geolocation of the user device at the time of the request.

At 530, the computer system compares the current contextual information with prior contextual information for database requests. In some embodiments, the contextual information includes information associated with the database operation request and information associated with the user device. In some embodiments, a device of the user (e.g., user device 120) requesting the database operation performs element 530 via an authenticator application (e.g., client-side authenticator application 312). For example, application 312 may compare current contextual information with contextual information for database operation requests submitted by this same user previously (e.g., application 312 may store prior contextual information for this purpose).

At 540, the computer system selects, based on the comparing, a security level from the multiple different security levels. In some embodiments, the computer system transmits, to a computing device associated with another user, an authorization request for the database operation, where the transmitting is performed based on the selected security level, and where the authorization request includes at least a portion of the current contextual information. The computing device associated with another user may be other user device 370 shown in FIG. 3, for example.

In some embodiments, the security level is further selected based on a type of data accessed by the requested database operation and a type of operation indicated in the contextual information. For example, the type of data included in the set of query data may be archived data and the type of operation indicated in the contextual information may be a data restore operation.

In some embodiments, the known device of the user and the user device are the same. For example, a user may submit a database operation request from their cell phone and the computer system may send an authorization request for the database operation to this user's cell phone rather than to one of their other devices, such as a work computer. In this example, the user has an authenticator application downloaded on their cell phone. This application communicates with computer system to present a notification to the requesting user via their cell phone's screen in order to obtain authorization from the user for the database operation they requested.

At 550, the computer system initiates, based on the selected security level, verification of a corresponding subset of authentication factors. In some embodiments, the selected security level automates verification of its subset of authentication factors and does not require input from the user for authentication factors. For example, based on the selected security level, computer system 110 verifies one or more passive authentication factors (e.g., a location of the requesting user's mobile device or known devices being in proximity to the user's mobile device based on BLUETOOTH signals). The computer system 110 then automatically approves the requested database operation based on these factors without requiring user input.

At 560, the computer system determines, based on whether the subset of authentication factors is verified, whether to authorize the requested database operation. In some embodiments, the computer system performs, based on determining to authorize the database operation, the database operation.

Figure 6:
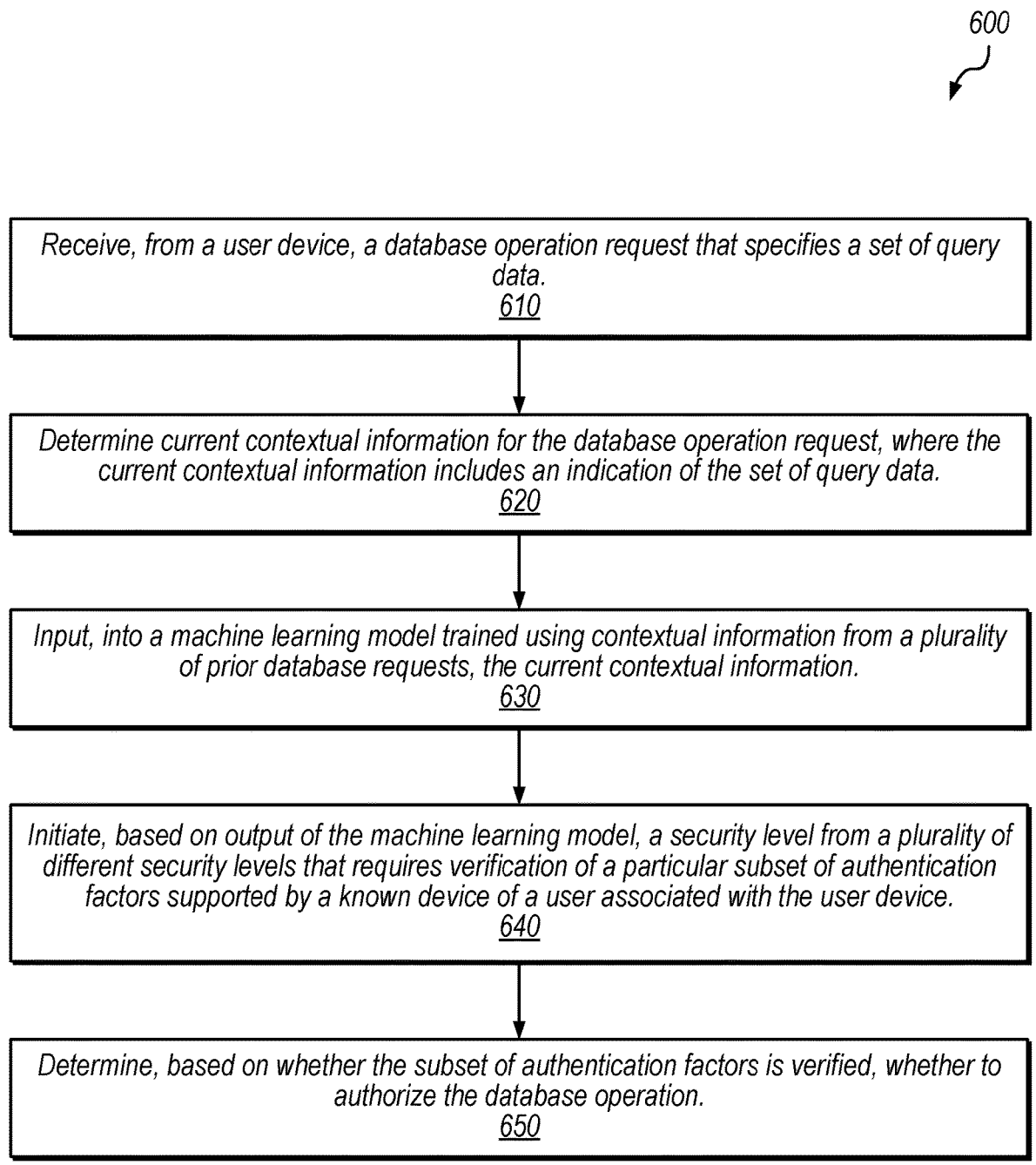
FIG. 6 is a flow diagram illustrating a method for determining a subset of authentication factors to verify for a requested database operation using machine learning techniques, according to some embodiments.

FIG. 6 is a flow diagram illustrating a method for determining a subset of authentication factors to verify for a requested database operation request using machine learning techniques, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Method 600 may be performed by computer system 310, for example.

At 610, in the illustrated embodiment, a computer system receives, from a user device, a database operation request that specifies a set of query data. The set of query data is data stored in a database that the user wishes to alter in some way (e.g., delete, add to, mask etc.).

At 620, the computer system determines current contextual information for the database operation request, where the current contextual information includes an indication of the set of query data. In other embodiments, a user device (e.g., user device 120 or mobile device 360) determines the current contextual information for the database operation request. For example, the user device may determine this information based on its environment and then transmit this information to the computer system for comparison with prior contextual information for various other database operation requests. In some embodiments, the current contextual information further includes an indication that the database operation is a data masking operation for the set of query data and that the set of query data is stored in a non-production environment.

At 630, the computer system inputs, into a machine learning model trained using contextual information from a plurality of prior database requests, the current contextual information. The machine learning model may be a machine learning classifier, for example. Specifically, this classifier may output various different classifications for database operation requests that specify different security levels to be implemented for these requests.

At 640, the computer system initiates, based on output of the machine learning model, a security level from a plurality of different security levels that requires verification of a particular subset of authentication factors supported by a known device of a user associated with the user device. In some embodiments, the particular subset of authentication factors includes a factor that involves a display, generated via an authenticator application, of a notification and a request for verification to a user associated with the database operation request, and where the authenticator application transmits the notification and request for display via an out-of-band mechanism.

At 650, the computer system determines, based on whether the subset of authentication factors is verified, whether to authorize the database operation. For example, if all of the authentication factors are verified, the system executes the database operation.

Example Computing Device

Figure 7:
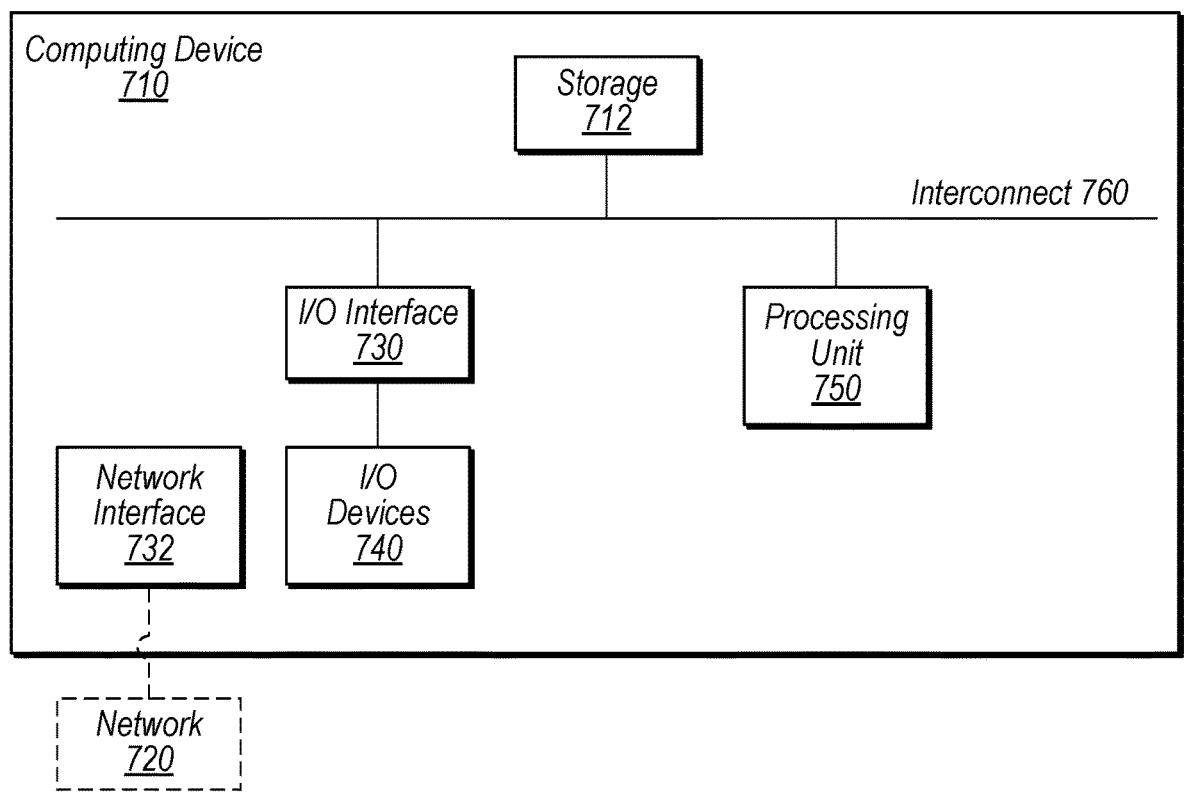
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system (e.g., mobile device 360), desktop computer (e.g., other user device 370), laptop or notebook computer, mainframe computer system, web server, workstation, or network computer (e.g., computer system 110). As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A method, comprising:
   receiving, by a computer system from a user device, a database operation request that specifies a set of query data, wherein the computer system supports multiple different security levels that require different subsets of a set of authentication factors supported by a known device of a user associated with the user device;
   determining current contextual information for the database operation request, wherein the current contextual information includes an indication of the set of query data, including an indication of a type of data upon which the database operation is to be performed;
   selecting, by the computer system based on the current contextual information, a security level from the multiple different security levels, wherein the subset of the set of authentication factors required by the selected security level includes a factor that involves a display, generated via an authenticator application, of a notification and a request for verification to a user associated with the database operation request, wherein the notification specifies at least a portion of the current contextual information; and
   revoking, by the computer system based on the subset of the set of authentication factors required by the selected security level, access privileges of the user for accessing a database corresponding to the database operation request.

2. The method of claim 1, wherein the selecting is further performed based on:
comparing, by the computer system, the current contextual information with prior contextual information for database requests.

3. The method of claim 1, wherein after revoking the access privileges of the user, the operations further comprise:
initiating, by the computer system based on the selected security level, verification of a corresponding subset of authentication factors;
determining, by the computer system based on whether the subset of authentication factors is verified, whether to grant access privileges to the user again; and
determining, based on determining whether to grant the access privileges again, whether to authorize the requested database operation.

4. The method of claim 1, wherein the current contextual information further includes an indication that the database operation is a data masking operation for the set of query data and that the set of query data is stored in a non-production environment.

5. The method of claim 1, wherein the known device of the user and the user device are the same, and wherein the selected security level automates verification of its subset of authentication factors and does not require input from the user for authentication factors.

6. The method of claim 1, further comprising, prior to revoking the access privileges of the user:
transmitting, by the computer system to a computing device associated with another user, an authorization request for the database operation, wherein the transmitting is performed based on the selected security level, and wherein the authorization request includes at least a portion of the current contextual information.

7. The method of claim 6, wherein the revoking is performed in response to the computing device associated with another user sending a response to the authorization request indicating that the request for the database operation is denied.

8. The method of claim 1, wherein the supported set of authentication factors includes one or more of the following types of authentication factors: a biometric identifier, a personal identification number (PIN), a password, one or more computing devices within the same geolocation as the user device, a geolocation of the user device, ambient noise relative to the user device, and one or more applications downloaded on the user device.

9. The method of claim 1, wherein the current contextual information includes one or more of the following types of information for the database operation request: an identifier of the user submitting the request, a set of data indicated in the request, an organization of the user submitting the request, an identifier of the user device, a timestamp of the request, and a geolocation of the user device at the time of the request.

10. A non-transitory computer-readable medium having instructions stored thereon that are executable by a computer system to perform operations comprising:
receiving, from a user device, a database operation request that specifies a set of query data, wherein the computer system supports multiple different security levels that require different subsets of a set of authentication factors supported by a known device of a user associated with the user device;
determining current contextual information for the database operation request, wherein the current contextual information includes an indication of the set of query data;
selecting, based on the current contextual information, a security level from the multiple different security levels;
transmitting, to a computing device associated with another user based on the selected security level, an authorization request for the database operation that includes at least a portion of the current contextual information; and
revoking, based on the selected security level and a response from the other user to the authorization request, access privileges of the user for accessing a database corresponding to the database operation request.

11. The non-transitory computer-readable medium of claim 10, wherein the selecting is further perform based on:
comparing the current contextual information with prior contextual information for database requests.

12. The non-transitory computer-readable medium of claim 10, wherein after revoking the access privileges of the user, the operations further comprise:
initiating, by the computer system based on the selected security level, verification of a corresponding subset of authentication factors;
determining, by the computer system based on whether the subset of authentication factors is verified, whether to grant the access privileges again; and
determining, based on determining whether to grant the access privileges again, whether to authorize the requested database operation.

13. The non-transitory computer-readable medium of claim 10, wherein the current contextual information includes one or more of the following types of information for the database operation request: an identifier of the user submitting the request, a set of data indicated in the request, an organization of the user submitting the request, an identifier of the user device, a timestamp of the request, and a geolocation of the user device at the time of the request.

14. The non-transitory computer-readable medium of claim 10, wherein the subset of authentication factors includes a factor that involves a display, generated via an authenticator application, of a notification and a request for verification to a user associated with the database operation request, and wherein the authenticator application transmits the notification and request for display via an out-of-band mechanism.

15. The non-transitory computer-readable medium of claim 14, wherein the notification specifies at least a portion of the current contextual information, and wherein the set of query data included in the current contextual information indicates a type of data upon which the database operation is to be performed.

16. A system, comprising:
at least one processor; and
a memory having instructions stored thereon that are executable by the at least one processor to cause the system to:
receive, from a user device, a database operation request that specifies a set of query data, wherein the system supports multiple different security levels that require different subsets of a set of authentication factors supported by a known device of a user associated with the user device;

determine current contextual information for the database operation request, wherein the current contextual information includes an indication of the set of query data and an indication that the database operation is a data masking operation for the set of query data and that the set of query data is stored in a non-production environment;

select, based on the current contextual information, a security level from the multiple different security levels; and revoke, based on the selected security level, access privileges of the user for accessing a database corresponding to the database operation request.

17. The system of claim 16, wherein the selecting is further performed based on:

comparing, by the system, the current contextual information with prior contextual information for database requests.

18. The system of claim 16, wherein after revoking the access privileges of the user, the instructions are further executable by the at least one processor to cause the system to:

initiate, based on the selected security level, verification of a corresponding subset of authentication factors;

determine, based on whether the subset of authentication factors is verified, whether to grant the access privileges to the user again; and determine, based on determining whether to grant the access privileges again, whether to authorize the requested database operation.

19. The system of claim 16, wherein the instructions are further executable by the at least one processor to cause the system to:

transmit, to a computing device associated with another user, an authorization request for the database operation, wherein the transmitting is performed based on the selected security level, wherein the authorization request includes at least a portion of the current contextual information, and wherein the revocation of access privileges of the user is performed based on receiving a response from the computing device associated with another user indicating to reject the request for the database operation.

20. The system of claim 16, wherein the subset of authentication factors includes a factor that involves a display, generated via an authenticator application, of a notification and a request for verification to a user associated with the database operation request, wherein the notification specifies at least a portion of the current contextual information, and wherein the set of query data included in the current contextual information indicates a type of data upon which the database operation is to be performed.

* * * * *